Jan. 24, 1967 S. E. ZOCHOLL 3,300,685
STATIC OVERCURRENT RELAY
Filed Jan. 4, 1963 7 Sheets-Sheet 1
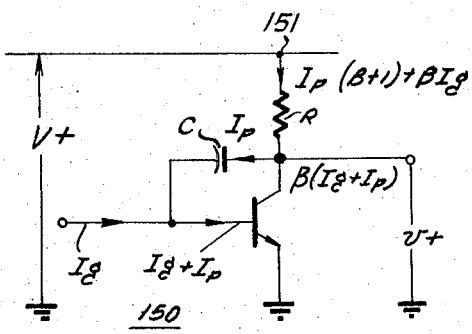
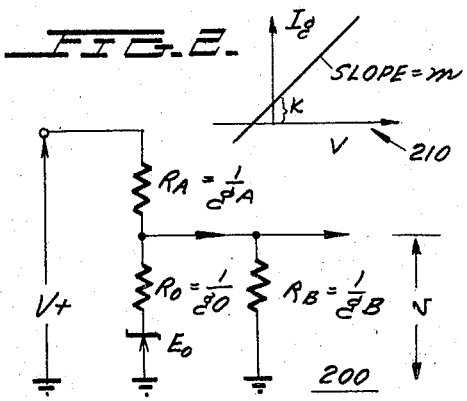
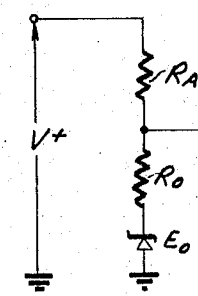
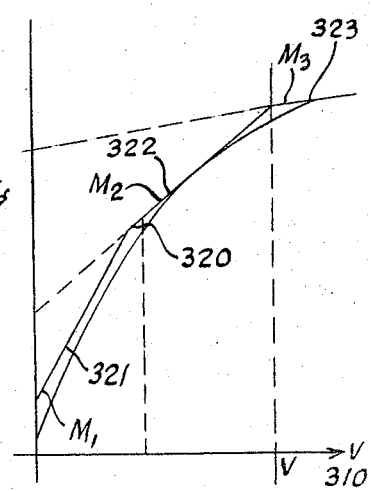
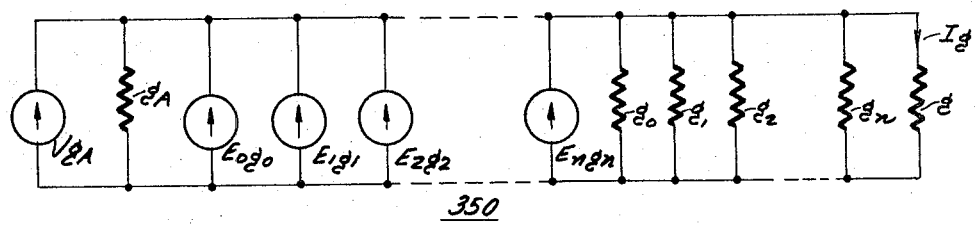
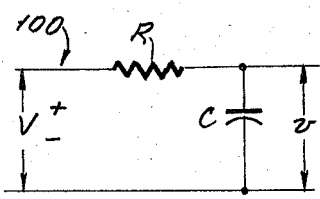
INVENTOR.
STANLEY E. ZOCHOLL
BY
OSTROLENK, FABER, GERB & SOFFEN
ATTORNEYS

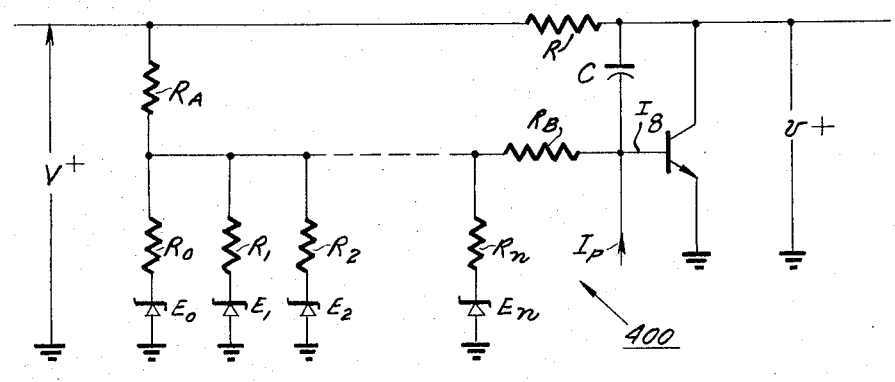
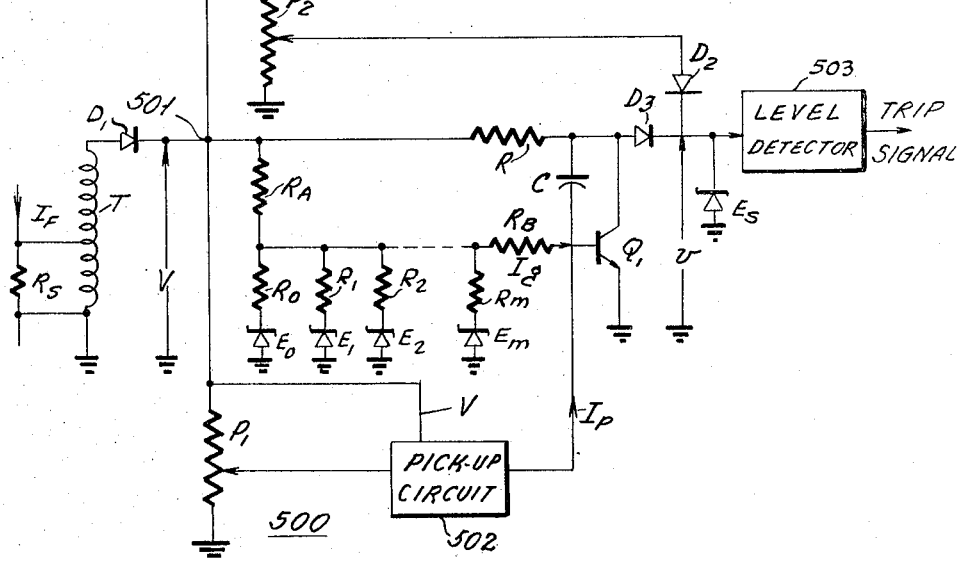
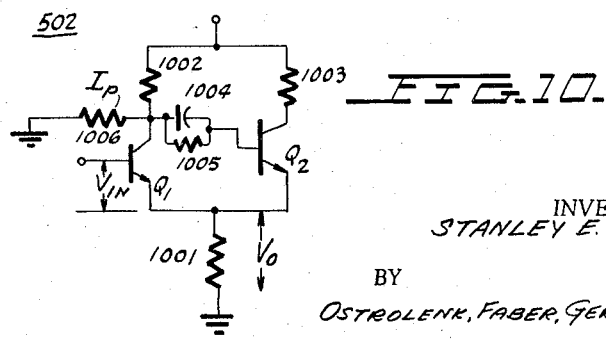

$$t = (1+\beta)RC \ln \frac{KI_F^2}{KI_F^2 - v_1}$$

INVENTOR.
STANLEY E. ZOCHOLL
BY
OSTROLENK, FABER, GERB & SOFFEN
ATTORNEYS

INVENTOR.
STANLEY E. ZOCHOLL
BY
OSTROLENK, FABER, GERB & SOFFEN
ATTORNEYS

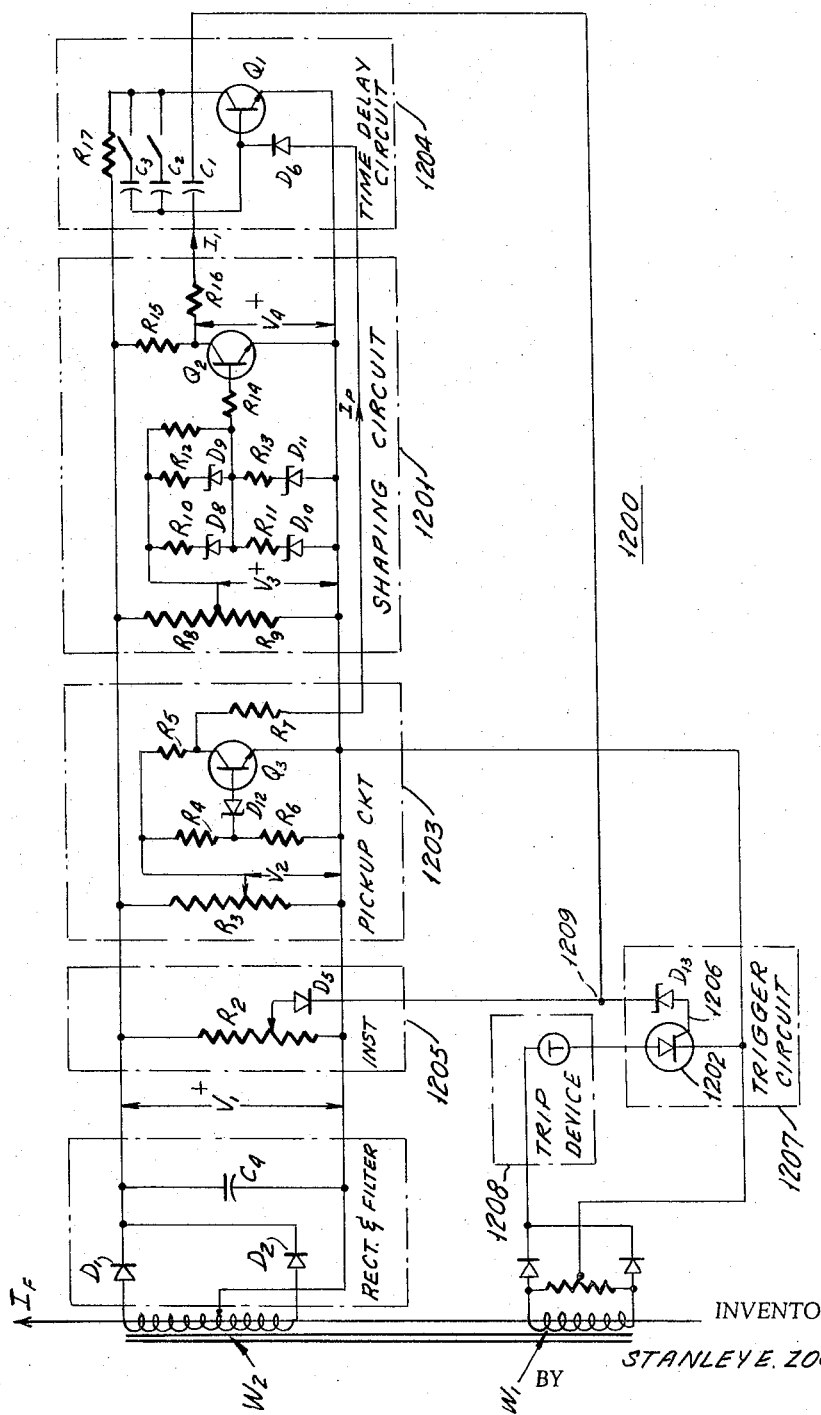

INVENTOR.
STANLEY E. ZOCHOLL
BY
OSTROLENK, FABER, GERB & SOFFEN
ATTORNEYS

INVENTOR.
STANLEY E. ZOCHOLL
BY
OSTROLENK, FABER, GERB & SOFFEN
ATTORNEYS

United States Patent Office 3,300,685
Patented Jan. 24, 1967

3,300,685
STATIC OVERCURRENT RELAY
Stanley E. Zocholl, Philadelphia, Pa., assignor to I-T-E Circuit Breaker Company, Philadelphia, Pa., a corporation of Pennsylvania
Filed Jan. 4, 1963, Ser. No. 248,463
17 Claims. (Cl. 317—33)

This invention relates to circuit protective devices and more particularly to static means for protecting a circuit which employs a novel arrangement for controlling overcurrent protection in accordance with the equation for temperature rise for the circuit being protected.

The current carrying capacity of an electrical conductor is determined by its temperature rise. The current in the conductor can be safely increased until a maximum temperature level is reached. If this maximum temperature level is exceeded, thermal damage will occur to the conductor and to the load which it feeds.

A simplified heat equation can be used to describe the temperature rise due to current:

$$i^2R = [Cm][d\theta/dt] + [KA/l]\theta \tag{1}$$

where $i$, $R$ and $\theta$ are respectively the current, electrical resistance, and temperature rise above the ambient; $C$ and $m$ are the thermal capacity and mass associated with heat storage in the conductor; $k$, $A$ and $l$ are respectively the thermal conductivity, area and length associated with the heat flow from the conductor.

Time-overcurrent relays have been built which take advantage of the time lag of temperature rise described by equation (1). Ideally these relays should have dynamic characteristics described by equation (1). However, the electro-mechanical relay used for this purpose is basically a mass being driven by a force caused by input current. The mass is restrained by some form of viscous damping. This system is described by the following equation:

$$Bi^2 = m[du/dt] + Du \tag{2a}$$

$$x = {}_o\!\int^t u\, dt \tag{2b}$$

where B is a proportionality factor and $i$ is the input current; $m$ and $D$ are the mass and damping coefficient respectively; $u$ and $x$ are the velocity and travel of the mass.

Equation (2a) is of the same form as equation (1). Consequently, velocity ($u$) is an analog of temperature ($\theta$). However, the electro-mechanical relay function for travel ($x$) is the integral of velocity since the tripping operation occurs when the armature travels a predetermined distance regardless of the velocity at which it moves.

Because travel ($x$) is an integral, the armature must be prevented from moving until a predetermined force is reached. The current corresponding to this force is called the "pickup current." A spring is usually used for this purpose (i.e., to restrain movement of mass until pickup current level is reached). The further dynamic effect of the spring has no function in this system.

The form of equation (1) suggests the use of an R-C integrating circuit as the time delay element of an overcurrent relay. The equation for the voltage charge ($v$) on the capacitor is given by:

$$V/R = C[dv/dt] + v/R \tag{3}$$

A relay using this time delay principle has certain advantages over the electro-mechanical relay. Among these is resistance to mechanical shock and reduced wear and increased reliability due to the elimination of moving parts. However, the simple R-C circuit has the following deficiencies when applied as an analog of equation (1).

(a) The input voltage is a linear function of the conductor current rather than the input raised to a power as in equation (1).

(b) Usually large values of capacitance are required to produce time delays suitable for thermal application of the relay.

(c) In order to construct a relay having characteristics like those of the electro-mechanical relays in present use, the capacitor would have to be prevented from charging until the input reached the "pickup value."

Problem (a) might be answered by interposing a non-linear circuit between the input and the R-C circuit. In this way, the non-linear input could be met. However, this would cause equation (3) to have non-constant coefficients and the intermediate circuit would therefore produce a different time constant for each magnitude of input signal.

Problem (b) could be answered by using an amplifier with capacitive feed-back as the R-C circuit. In this way the time constant can be amplified. However, the conventional circuit requires a fixed power supply voltage and an initial charge on the capacitor for normal operation. The capacitor discharges exponentially from the initial charge voltage and is, therefore, a solution of equation (3). A difficulty, however, arises in establishing the initial charge voltage on the capacitor from a zero voltage start. This difficulty precludes the use of a current transformer to provide both input and power supply voltage since zero primary current is a normal operating condition. This is due to the fact that a time delay is needed to charge up the capacitor and this cannot be done when a fault occurs on a no load circuit.

The instant invention provides an all-electronic circuit which is so designed as to generate an output voltage which is represented by equation (1) and which further completely overcomes the deficiencies of the simple R-C integrating circuit described above, while at the same time containing all the qualities of the conventional electro-mechanical time current relay.

The instant invention is comprised of amplifier means having capacitive feed-back which is so designed as to provide a substantially large circuit time constant due to the amplifier characteristics so as to avoid the need for employment of unusually large capacitances in the time delay circuit. The amplifier means is provided to generate a voltage sufficient to trigger a trip device designed to isolate the conductor being protected at a time when the overload or short-circuit current reaches critical proportions in order to prevent overheating of the conductor being protected. It is necessary that the amplifier means follow the current versus time curve in order to provide instantaneous tripping operation upon the occurrence of severe fault currents and to provide the tripping voltage after a predetermined time delay upon the occurrence of overload currents wherein overload currents are defined as those currents are greater in magnitude than the normal load current which the conductor is designed to carry. In summary, it can be said that the amplifier means thereby provides an inverse time function such that when the current increases from normal load current towards severe short-circuit current magnitudes the amplifier means generates the tripping voltage in increasingly smaller time periods such that for small overload currents the time delay is substantially long and for severe short-circuit currents the time delay is instantaneous.

The conductor being monitored is connected to the time delay means or amplifier means by suitable current transformer means which generates a voltage across its output windings which is linearly related to the current flowing in the conductor being monitored. Since this output voltage is linearly related to the current flowing through the conductor being regulated, circuit means are provided for generating a current which is a power of the current flowing in the monitored conductor, such as, for example, the $[I]^2$ term given in Equation 1 above. The curve of the $[I]^2$ term is a parabola, while the curve of the input voltage to the amplifier means having the feed-back capacitance is a linear curve. For this reason, the circuit providing the $[I]^2$ input to the amplifier means is so designed as to generate a voltage which may be subtracted from the output voltage curve in order to provide the necessary parabolic relationship. Thus the circuit providing the necessary current input to the amplifier means which will hereinafter be referred to as a shaping circuit means, itself generates an output voltage which when plotted is in the form of a parabola which is subtracted from the linear voltage curve to provide the parabolic curve which represents the trigger voltage which is the ultimum output voltage employed for triggering the trip circuit in order to isolate the conductor being monitored.

The non-linear output is derived by employing a plurality of linear circuits which represent a linear approximation of the current versus input voltage curve which is to be generated. This requirement is derived from the fact that while a current I flows through the conductor which is to be protected, the heat equation requires an $I^2$ term which is a non-linear function of the current I.

Whereas the operating range of one typical shaping circuit curve for the temperature equation has positive slope, the actual equation waveform nevertheless has portions of the curve having a negative slope. This condition is provided for by providing a second form of linear circuit elements in the non-linear circuit which are arranged in a bridge network with the circuit elements which approximate portions of the curve in positive slope so as to generate a composite non-linear curve having both negative and positive slope.

The output of the circuit which generates a linear approximation of the non-linear curve desired is then employed to control the R-C circuit for the purpose of generating the voltage which approximates the $I^2$ term of the heat equation.

A pickup circuit is employed for the purpose of preventing charging of the capacitive element until a predetermined voltage level is surpassed in order to prevent the generation of a tripping signal at times when a normal current flow occurs in the circuit. The pickup circuit thereby effectively short circuits the capacitor element when the input voltage to the capacitor circuit is smaller than the pickup voltage value.

In cases where the overcurrent flowing in the conductor to be protected is so great as to cause substantial harm so that an instantaneous tripping signal is necessary, it is important to bypass the capacitive circuit in order to provide instantaneous tripping. Suitable diode means are provided between the input circuit and the output of the time delay circuit in order to permit an instantaneous tripping signal to be generated. Further means are provided to prevent charging of the capacitor element upon the occurrence of extremely large overcurrent conditions. A level detector circuit is connected to the capacitor circuit which instantaneously generates the trip signal sufficient to initiate the tripping operation to isolate the conductor being protected, immediately upon the occurrence of a predetermined voltage level which is indicative of a critical value beyond which severe damage will occur to the conductor being protected.

As an alternative embodiment the level detector circuit may be replaced by silicon controlled rectifier means which is provided in series relationship with the tripping means and upon receipt of the trip voltage signal, completes the series circuit to initiate the tripping operation. The silicon controlled rectifier means is superior to the level detector means recited previously in that its operating requirements, that is, the voltage necessary to gate the silicon controlled rectifier means, is substantially reduced from the requirements of the level detector means.

It should be understood that by proper design of the static time delay means shaping circuit, it is possible to follow any current versus time curve which may be found in power systems. For example, in addition to protecting conductors against heating due to overcurrent conditions, it is possible to employ the circuit of the instant invention to protect equipment, such as motors, against overheating due to overcurrent conditions. Although the current versus time curve for such motors may differ markedly from the temperature versus time curve for a conductor being monitored, the differences may be compensated for in a very simple manner, simply by altering the operating characteristics of the time delay circuit shaping means.

Therefore, one object of the instant invention is to provide static time delay means responsive to overcurrent conditions in a circuit being protected having novel means for electronically representing the heat equation of the circuit to be protected.

Still another object of the instant invention is to provide static time delay means responsive to overcurrent conditions in a conductor having novel means for producing a linear approximation of the temperature curve for the conductor being protected.

Still another object of the instant invention is to provide static time delay means responsive to overcurrent conditions in a conductor employing a novel circuit for generating a current which is a linear approximation of the current imposed upon the feed-back amplifier means which in turn generates the necessary power of current in order to cause the static time delay means to follow the current imposed curve wherein the said curve may have both a positive and negative slope.

Still another object of the instant invention is to provide a static time delay circuit responsive to overcurrent conditions in a conductor wherein the means for producing the current imposed curve representing the heating of the conductor employs a novel bridge circuit which is adapted to produce the linear approximation of the current imposed upon the feed-back amplifier means the curve of which has both positive and negative slope.

Still another object of the instant invention is to provide a static time delay circuit responsive to overcurrent conditions employing a novel pick-up circuit which prevents the generation of a trip signal in situations where the conductor is carrying a normal current load.

Still another object of the instant invention is to provide static time delay means responsive to overcurrent conditions in a conductor which employs the circuit capable of generating substantially long time delays where a trip signal is generated.

These and other objects of the instant invention will become apparent when reading the accompanying description of the drawings in which:

FIGURE 1 is a schematic diagram of an amplifier circuit employed in the instant invention.

FIGURE 1a is a schematic diagram of a typical R-C integrating circuit.

FIGURE 2 is a schematic diagram showing one element of the linear approximating circuit employed to generate the non-linear current which is imposed on the feedback means.

FIGURE 3a is a schematic diagram showing a plurality of linear approximating elements of the type shown in FIGURE 2 employed in a composite circuit.

FIGURE 3b is a schematic diagram showing an equivalent circuit for the schematic diagram of FIGURE 3a.

FIGURE 3c shows a plot of the piecewise linear curve portions derived through the use of the circuit of FIGURE 3a.

FIGURE 4 is a schematic diagram showing the connections between the linear approximating circuit of FIGURE 3a and the integrating circuit of FIGURE 1.

FIGURE 5 shows a static time delay circuit responsive to overcurrent conditions designed in accordance with the principles of the instant invention.

FIGURE 6 shows the time-current characteristics of the static time delay circuit of FIGURE 5.

FIGURE 10 is a schematic diagram of a pickup circuit which may be employed in the static time delay circuit of the instant invention.

FIGURE 12 is a schematic diagram showing alternative embodiment for the static time delay circuit of FIGURES 5 and 7.

Figure 6A:
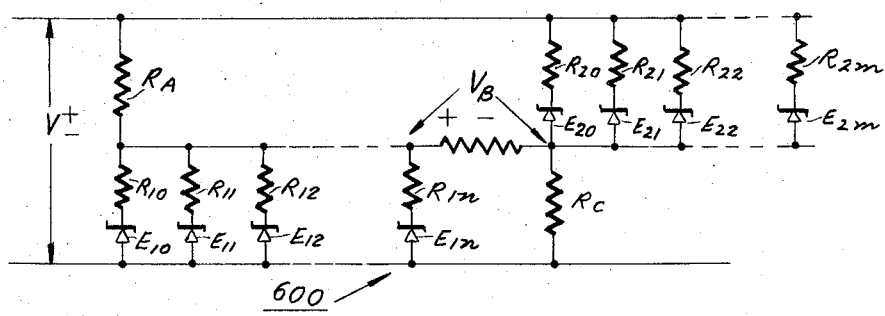
FIGURE 6a is a schematic diagram of an alternative embodiment of the linear approximation circuit of FIGURE 3a wherein the circuit of FIGURE 4 is capable of generating non-linear current output having both positive and negative slope.

Referring now to the drawings, FIGURE 1a shows an R-C integrating circuit 100 which may be employed in a time delay element of an overcurrent relay. The equation for the voltage charge ($v$) developed across the capacitor (C) is given by:

$$V/R = C[dv/dt]$$

Solving for $v$:

$$v = V(1 - e^{-t/RC})$$

While the circuit 100 has the advantages of being highly resistant to mechanical shock and of eliminating moving parts, it has the disadvantages of requiring unusually large values of capacitance to produce suitable time delays for thermal application of the relay and the input voltage (V) is a linear function of the input current (I) rather than the input raised to a power as in Equation (1). In addition it is necessary to prevent the capacitor (C) from charging until the input reaches the "input value" wherein the pickup value is defined as that value of current at which the temperature of the conductor becomes significant and must, therefore, be controlled.

The circuit 150 of FIGURE 1 is employed for the purpose of providing suitable time delay and at the same time avoiding the need for unusually large capacitances.

Circuit 150 has a gain B and a low impedance to the flow of input current ($I_g + I_p$). Circuit 150 is provided with a resistance (R), and a capacitor feed back (C) connected between output and input such that the following relation describes the output characteristics:

$$V - (I_g + I_p)BR = (B+1)RC[dv/dt] + v \quad (4)$$

where $v$ is the output voltage.

Let V be considered proportional to $i$ of Equation (1). Then, in order to make Equation (4) have the same form as Equation (1) let:

$$V - (I_g + I_p)BR = kV^2 \quad (5)$$

Now consider $I_p$ to be a constant or zero. Therefore:

$$BRI_g = V - kV^e - BRI_p \quad (6)$$

The basic concept of the invention is to let $I_g$ be made a function of V to make up a particular driving function (which in this case is of the form $kV^2$). As a result of this concept is that the input V can remain linear and non-linear circuitry can be employed to obtain the desired form of $I_g$ without affecting the time constant for various magnitudes of input voltage.

The general circuit also provides a pickup setting. If the value of $I_p$ is made such that $V < (I_g + I_p)BR$, the capacitor does not charge. This arrangement will be more fully described.

Figure 13:
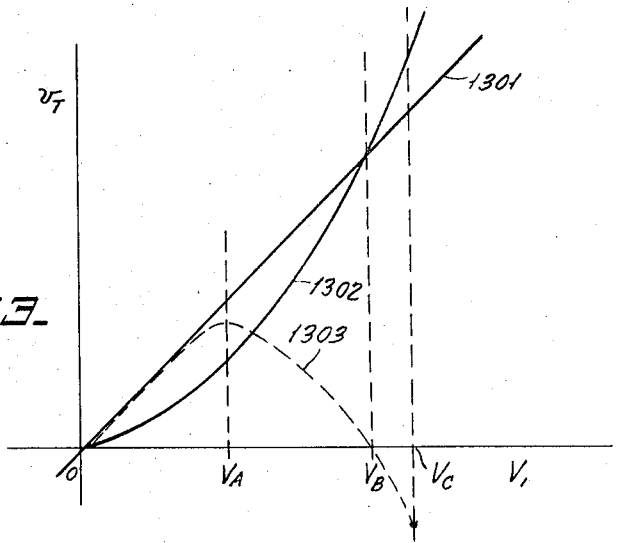
FIGURE 13 shows a plot of curves employed for the purpose of explaining the operation of the time delay circuit.

The voltage employed as the supply voltage for the feed back amplifier 150 of FIGURE 1 is a linear function of the current flowing in the conductor to be protected (not shown). The voltage V is developed by suitable current transformer means to be more fully described. FIGURE 13 shows a family of curves in the plot 1300 which serve to clearly describe the time delay means of the instant invention. The input voltage to the time delay circuit $E_1$ is plotted along the X axis while the trigger voltage $v_t$ is supplied along the Y axis. Curve 1301 is a plot of the voltage V against itself and is necessarily a straight line curve making an angle of 45° with the X axis. This represents the voltage impressed upon the point 151 of circuit 150. Curve 1302 which is a parabola, is the curve which the trigger voltage $v$ must follow in order to simulate the $I^2$ term of the temperature of Equation (1) previously recited. Since the only voltage which is available is the input voltage V, it is necessary to provide a subtractive operation in order to generate the curve 1302. This operation is performed by the shaping circuits of FIGURES 2, 3a, 3b, 6a and 9 to be more fully described. The output of the shaping circuit is shown by curve 1303 which in any given instant has its value subtracted from the value of the curve 1301 in order to produce the curve 1302. Curve 1303 is simulated by the piecewise linear approximation curve of FIGURE 3c as will be described. It should be noted that curve 1303 is also a parabola but is inverted with respect to the parabolic curve 1302.

Depending upon the operating range of the static over-current relay, the shaping circuit may be designed so as to generate an output which is positive in both magnitude and slope; or positive in magnitude and both positive and negative in slope; or both positive and negative in magnitude and slope. For example, in FIGURE 13, if the operating range does not exceed the value $V_A$ it can be seen that the parabolic curve has only positive slope and positive magnitude in the range from 0 to $V_A$. If the operating range extends to $V_B$ it can be seen that the parabolic curve from 0 to $V_B$ has only positive magnitude but has both positive and negative slope. If the operating range extends to $V_c$, it can be seen that the parabolic curve has both positive and negative magnitude as well as positive and negative slope.

A unique method of obtaining the non-linear shaping circuit for an application which extends only from the range of 0 to $V_A$ will be described. This method uses constant voltage devices and resistors to obtain a linear approximation of a non-linear function.

Let the function of Equation (6) be represented by a Taylor's series about point $V_m$.

$$BRIg = \alpha = \alpha(V_m) + \alpha'(V_m)(V - V_m) + \frac{\alpha''(V_m)}{2}(V - V_m)^2 \quad (7)$$

$$\alpha_1(V_m) = V_m - kV_m^2 - BRI_p$$
$$\alpha'(V_m) = 1 - 2kV_m$$
$$\alpha''(V_m) = 2k$$

substituting these relations in (7) gives:

$$BRIg + \epsilon = (1 - 2kV_m)V + (kV_m^2 - BRI_p) \quad (8)$$

Since only the linear terms can be used in the approximation, $\epsilon$ in Equation (8) represents the deviation of the linear approximation.

$$\epsilon = k(V - V_m)^2 \quad (9)$$

The basic circuit 200 dicated by Equation (8) is shown in FIGURE 2. For V>E, $$I_g = \frac{g^A g^B}{g^A + g^B + g^O} V + \frac{g^O g^B}{g^A + g^B + g^O} E_o \quad (10)$$

or $$Iq = mV + K \text{ where } m = \frac{g^A g^B}{g^A + g^B g^O}$$

and $$K = \frac{g^O g^B}{g^A + g^B + g^O} E_o$$

It can thus be seen that the circuit 200 of FIGURE 2 provides a curve as shown by the plot 210 having a slope $m$ and a positive intercept crossing the $I_g$ axis a distance K from the V axis.

By employing a plurality of circuits of the type 200 shown in FIGURE 2, it is possible to provide a linear approximation for the curve 320 shown in plot 310 of FIGURE 3c such that a first segment 321 of linear approximation has a slope $m_1$, the second segment 322 a slope $m_2$, and a third segment 322 the slope $m_3$ whereby these segments considered collectively generate the extremely close approximation for the curve 320 and hence the curve 1303 relating input voltage V to output current $I_g$. The general circuit for generating the curve of the type shown in plot 310 is the circuit 300 of FIGURE 3a which is provided with a plurality of branches each containing a resistor $R_n$ and a zener diode $E_n$ where the number of such branches employed is dictated by the number of segments needed to generate the linear approximation for the curve such as for example the curve 320 shonw in plot 310. The general circuit 300 provides the necessary number of straight line segments to represent the function with a deviation $\epsilon$ held to a predetermined value. An equivalent circuit 350, as shown in FIGURE 3b, is provided for facilitating the development of the following derivation. As in the previous circuits of FIGURES 2 and 3a, the voltage devices employed are zener diodes $E_o$ through $E_n$. It should be understood, however, that constant voltage sources and diodes may be employed in place of the zener diode shown in FIGURE 3a.

The derivation of $I_g$ is as follows for $E_m < V < E_m + 1$:

$$gBV_B \left[ \sum_{R=0}^{m} g^K + g^A + g^B \right] = g^A g^B + g^B \sum_{R=0}^{m} E_R g_R$$

$$Ig = V_B g_B$$

$$Ig = \frac{g_A g_B}{\sum_{R=0}^{m} g^R + g^A + g^B} V + \frac{g^B \sum_{R=0}^{m} E_R g R}{\sum_{R=0}^{m} gk + gA + gB}$$

Equating the coefficients of (11) and (8) gives:

$$\frac{gA + gB}{\sum_{K=0}^{m} gk + g^A + g^B} = \frac{(1 - 2kV_m)}{BR} \quad (12a)$$

$$\frac{gB \sum_{R=0}^{m} Ekgk}{\sum_{R=0}^{m} gk + gA + gB} = \frac{kV^2 M - BkIp}{Bk} \quad (12b)$$

Now if the deviation $\epsilon$ is defined as follows:

$$\epsilon = pkV^Z \quad (13)$$

where $p$ is the desired tolerance of the approximation it can be shown that $$V_n = \alpha^n \psi_0 \quad (14a)$$

where $$\alpha = \frac{1 + \sqrt{p}}{1 - \sqrt{p}} \quad (14b)$$

and where $v_0$ is the first input voltage where the linear approximation coincides with the desired function. Equation (12) can be solved for the $m$th value of $gk$ and $E_k$. This is done by setting $m = 0, 1, 2 \text{ - - -}$ and solving each successive equation for $gk$ and $E_k$. The solutions for the resistor and zener diode values expressed in terms of resistance are as follows:

$$R_o = \frac{(1 - 2kv_0) R_A R_B}{BR - (1 - 2kv_0)(R_A + R_B)} \quad (15a)$$

$$R_m = \frac{(1 - 2k\alpha^n v_0)(1 - 2k\alpha^{n-1} v_0)}{2kv_0 B k \alpha^{m-1}(2-1)} R_A R_B, \; m = 1, 2, 3 \text{ - - -} \quad (15b)$$

$$E_o = \frac{R_B(kv_0^2 - BRIp)}{BR - (1 - 2kv_0)(R_A + R_B)} \quad (16a)$$

$$E_m = \frac{\alpha^{m-1}}{Z_1 B} \frac{RB}{R} v_0 (2 + 1 - 2k\alpha^n v_0) \quad (16b)$$
$$+ Ip R_B, \; M = 1, 2, 3$$

The circuit utilizing the linear approximation method set forth immediately above is shown in FIGURE 4 wherein the circuit 400 has an input voltage V which is linearly related to the current through the conductor to be monitored (not shown) in order to closely monitor its operating temperature. The input voltage V generates a current $I_g$ which is related in a non-linear fashion to input voltage V and hence to the current in the conductor being monitored. In order to establish the power relationship set forth by Equation (1) above, the current $I_g$ generates the output voltage $v$ which is dependent upon the input current $I_g$ in accordance with the expression of Equation 1 in order to establish the necessary time delay relationship between output $v$ and current $I_g$.

Equation (16b) shows that for $m = L$, where L is the largest value of $m$ to be used, $R_1$ can be eliminated. The special condition to accomplish this is:

$$(1 - 2R\alpha^M v_0) = 0$$

A design procedure based on this special condition is as follows:

(a) Choose the following parameters:
R—current gain of amplifier
$v_{so}$—1 per unit output voltage
$\beta$—range of device
R—time-constant resistor
$E_L$—highest value reference voltage
$p$—tolerance of linear approximation in per unit
A—factor for calculating $R_A$ in terms of R
$I_p$—constant input current (b) $\qquad$ Calculate $\alpha = \dfrac{1 + \sqrt{p}}{1 - \sqrt{p}}$ (c) $\qquad$ Calculate L = largest integar $< \dfrac{\ln B}{\ln \alpha}$ (d) $\qquad$ Calculate $v_0 = 2\alpha^L v_{so}$ (e) $\qquad$ Calculate $R_B = \dfrac{2BRE_L}{\alpha^L v_0 + 2BRIp}$ (f) Calculate $$-M - 1 = \frac{\alpha^{M-2} v_0 [\alpha^L(\alpha + 1) - \alpha^{M-1}] + 2\alpha^2 BRIp}{\alpha^{M-1} v_0 [\alpha^2(\alpha + 1) - \alpha^M] + 2\alpha^L BIp} E_1$$

(g) $\qquad$ Calculate $R_A = AR$ (h) $\qquad$ Calculate $E_u = \dfrac{R_B}{2} \cdot \dfrac{v_0 - 2\alpha^L BRIp}{\alpha^L BR - (\alpha^L - 1)(R_A + R_B)}$ (i) Calculate $$RM \frac{(\alpha^L - \alpha^M)(\alpha^{L-M-1}) R_A R_B}{B R \alpha^{L+M-1}(\alpha - 1)}, M = 1, 2, 3 \text{ - - -}, L$$

(j) Calculate $$RM - 1 = \frac{\alpha(\alpha^L - \alpha^{M-2})}{\alpha^L - \alpha^M} RM, M = 2, 3, 4 \text{ - - -}(L-1)$$

(k) Calculate $R_o = \frac{(\alpha^L - 1) R_A R_B}{\alpha^L B R - (\alpha^L - 1)(R_A + R_B)}$ A further refinement can be made by letting $E_0 = 0$. Under this condition $I_p$ must take on the special value:

$$I_p = \frac{v_o}{2\alpha^L B R} = \frac{v_{so}}{BR}$$

FIGURE 5 shows a time delay circuit 500 employed for use as a time overcurrent relay. The current $I_f$ from the conductor being regulated (not shown) is fed through a shunt resitsor $R_s$. The voltage drop across $R_s$ is impressed upon a transformer T. The output of transformer T is rectified by a diode $D_1$ such that a voltage signal V proportional to the absolute value of $I_f$ is thereby impressed upon the input terminal 501 of the time delay circuit 500.

The time-delay circuit consists of resistors $R_0$, $R_1$, $R_2$ - - - $R_m$, $R_A$, $R_B$ and R; voltage references (zener diodes in this case) $E_0$, $E_1$, $E_2$, - - - $E_m$; capacitor C and transistor $Q_1$. The output of the time-delay circuit is $v$ which is governed by the relation:

$$[V - BR(I_g + I_p)] = kV^2 = (B+1)RC[dv/dt] + v \quad (17)$$

where B is the current gain of transistor $Q_1$, $I_g$ is the current in resistor $R_B$ and $I_p$ is the current leaving the circuit called the pickup circuit 502.

The signal V is also placed on potentiometer $P_1$ which feeds a signal to the pickup circuit 502. Pickup circuit 502 functions as follows:

$$V < v_1, I_p > [V/BR] - I_g$$
$$V > v_1, I_p = \text{a constant} < [V/BR] - I_g \quad (18)$$

Conditions (18) cause the transistor $Q_1$ to effectively short circuit the capacitor C when the input voltage V is less than the pickup value $v_1$.

The pickup circuit prevents the charging of capacitor C until the input voltage V reaches a predetermined value $v_1$. This value is chosen to be the voltage value at which the conductor being monitored has a temperature level which is approaching a critical value, such as to require the energization of the time delay circuit 500.

Now solving equation (17) for $v$ and considering conditions (18), the conditions for $v$ are:

$$V < v_1, v = 0$$
$$V > v_1, v = RV^2 \left(1 - \epsilon^{-\frac{t}{T}}\right) \quad (19)$$

where T=time constant of time delay circuit.

The output $v$ is fed to level detector 503 which produces a trip signal which is usually the making of a contact. The conditions for level detector 503 are:

$$v < v_1, \text{TRIP SIGNAL OFF}$$
$$v > v_1, \text{TRIP SIGNAL ON} \quad (20)$$

The input signal V is also placed on potentiometer $P_2$. The output of $P_2$ feeds the level detector 503 through diode $D_2$ which is used as a buffer.

This circuit by-passes the time-delay circuit and provides an instantaneous trip if the input voltage exceeds a predetermined value. The instantaneous setting is usually from 2 to 20 times $v_1$. Diode $D_3$ is used to prevent the charging of capacitor C from the output voltage of $P_2$. The zener diode $E_s$ is employed for the purpose of protecting the level detector circuit 503 so that voltages impressed upon the input terminal of level detector 503 do not exceed the capacity of the level detector.

Solving equation (17) to obtain the time-current relationship, it is found that the time-current characteristics of the circuit 500 of FIGURE 5 is shown by the plot 600 of FIGURE 6 which is exactly the time-current relationship required to provide successful operation of the time delay relay.

The circuit 300 of FIGURE 3a approximates the parabolic curve over the range 0 to $V_A$ shown in FIGURE 13, in which range the slope of the curve is always positive. In order to approximate the curve over the range 0 to $V_B$ where the slope goes from positive to negative, a bridge circuit consisting of resistor and voltage references is employed. Such a circuit is shown in FIGURE 6a. In the circuit 600 of FIGURE 6 voltage references $E_{10}$, $E_{11}$, $E_{12}$ - - - $E_{1n}$, $E_{20}$, $E_{21}$, $E_{22}$, - - - $E_{2m}$ are shown as zener diodes. Resistors are labeled $R_{10}$, $R_{11}$, $R_{12}$, - - - $R_{1n}$, $R_{20}$, $R_{21}$, $R_{22}$, - - - $R_{2m}$, $R_A$, $R_B$, and $R_C$. The output $V_B$ gives the desired linear approximation of equation (6) wherein the brances containing resistors $R_{20}$ through $R_{2m}$ provide the negative slope for the curve.

Figure 7:
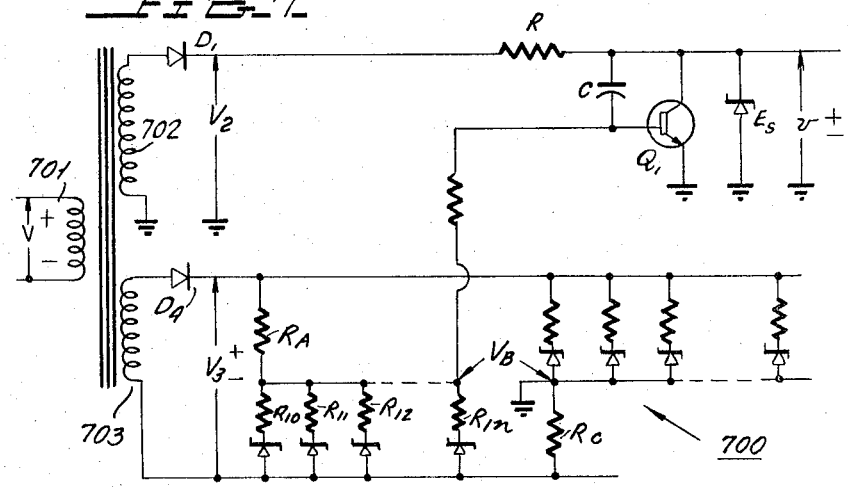
FIGURE 7 shows an alternative embodiment for the static time delay circuit of FIGURE 5.

FIGURE 7 shows a schematic diagram 700 which employs the bridge circuit 600 of FIGURE 6a applied to the amplifier circuit of the type shown in FIGURE 1. In the embodiment 700 of FIGURE 7 an A.C. signal input $V_1$ is applied to the input winding 701 of a transformer T having two output windings 702 and 703. Winding 702 generates an output voltage which is rectified by diode $D_1$ to produce the D.C. voltage $V_2$. This voltage is applied to the collector of transistor $Q_1$ through resistor R. The second output winding 703 generates a voltage which is rectified by diode $D_4$ to give the D.C. voltage $V_3$. $V_3$ is the input voltage for the bridge circuit and is proportional to $V_2$. The output of the bridge circuit is $V_b$. Transformer T is employed to provide the necessary isolation for the bridge circuit. Thus the embodiment 700 of FIGURE 7 differs from the embodiment 500 of FIGURE 5 in that the bridge circuit employed in FIGURE 7 is capable of providing a linear approximation of a curve having both positive and negative slope and magnitude. The operation of circuit 700 of FIGURE 7 however, is substantially the same as the operation of the circuit of FIGURE 5.

Figure 8:
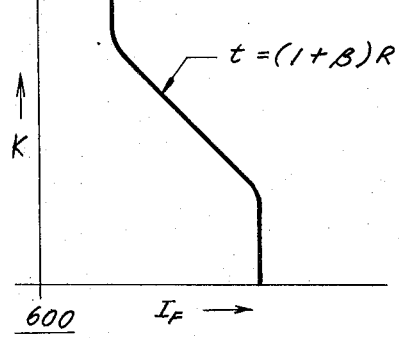
FIGURE 8 shows a plot of an input voltage versus an output voltage wave form employed for the purpose of describing the non-linear circuit of the instant invention.
Figure 8:
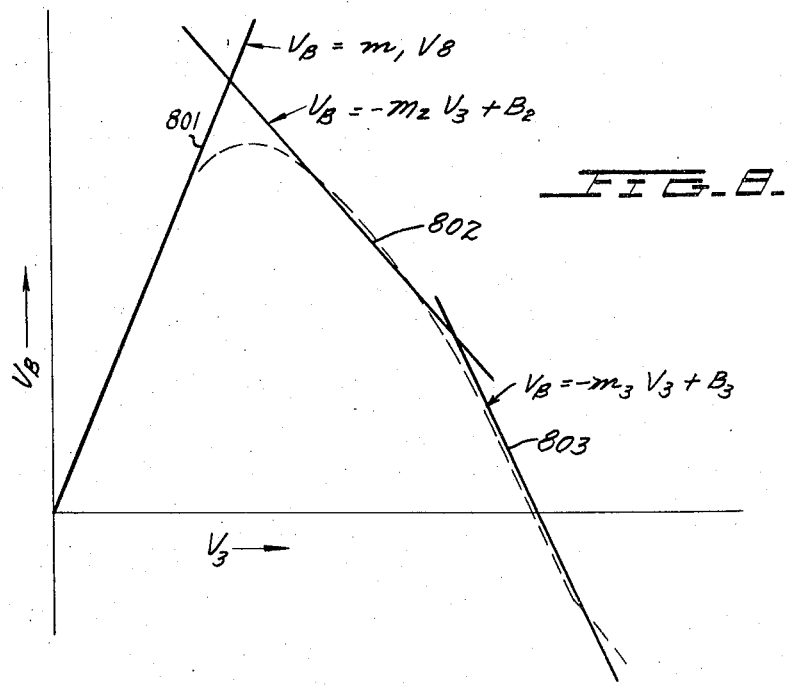

In certain applications it may be necessary to use an amplifier circuit of the type shown in FIGURE 1 which is not sufficiently linear so as to enable the employment of Equations (13)–(16a) given below. In such cases the amplifier input corresponding to Ri of Equation (6) can be determined experimentally. FIGURE 8 shows a typical curve of $V_b$ plotted as a function of $V_3$, which curve is comprised of three linear segments 801–803, respectively. The circuit employed to generate the linear approximation plotted in FIGURE 8 is the circuit 900, shown in FIGURE 9 of the drawings.

The design procedure for designing such a circuit is as follows:

(a) Choose $E_1$, $R_B$, $m_1$, $m_2$, $m_3$, $B_2$, $B_3$ (b) $$R_1 = \frac{B_2 - (m_2 + m_1) E_1}{m_1 B_2} \cdot R_B$$

(c) $$R_2 = \frac{E_1 - B_2}{m_2 E_1}$$

(d) $$R_3 = \frac{E_1 - B_2}{B_2 - m_2 E_1} R_B$$

(e) $$R_4 = \frac{(1 - m_2)(E_1 - B_2)}{(m_3 - m_1) E_1} R_B$$

(f) $$E_2 = \frac{B_3(1 - m_2) - B_2(1 - m_3)}{m_3 - m_2} E_1$$

One circuit which may be employed as the pick-up circuit 502 of FIGURE 5 is shown in FIGURE 10 wherein the circuit 1000, which is commonly known as a Schmitt trigger, is comprised of transistors $Q_1$ and $Q_2$ having their emitter electrodes connected in common to a resistor 1001 and having their collector electrodes connected to a voltage V through resistors 1002 and 1003 respectively. The input signal $P_1$ is impressed between the base electrode and reference potential of the transistor $Q_1$. When this voltage becomes sufficiently positive, transistor $Q_1$ conducts the collector electrode of transistor $Q_1$, is connected to the base electrode of transistor $Q_2$ through the collector base circuit comprised of parallel connected capacitor 1004 and resistor 1005. The collector electrode of transistor $Q_1$ moves towards ground causing transistor $Q_2$ to cut off. The conduction of transistor $Q_1$ generates a current I to reference potential through the transistor $Q_1$. A portion of this current is diverted through resistor 1006, this current being the pick-up current $I_p$ which as previously described is the minimum primary current at which the protective equipment controlling the conductor being monitored will initiate a tripping or isolating operation. It can therefore be seen that at any voltage value lower than the voltage $V_1$, transistor $Q_2$ remains conductive so as to generate a voltage drop across resistor 1001 preventing transistor $Q_1$ from conducting, thereby causing zero pick-up current to be injected into the base electrode of the transistor $Q_1$ of FIGURE 5 thereby preventing the capacitor C of FIGURE 5 from charging. It should be understood that the elements comprising FIGURE 10 are so selecetd as to generate pickup current $I_p$ in accordance with the requirements set forth by Equation (18) recited previously.

Figure 11:
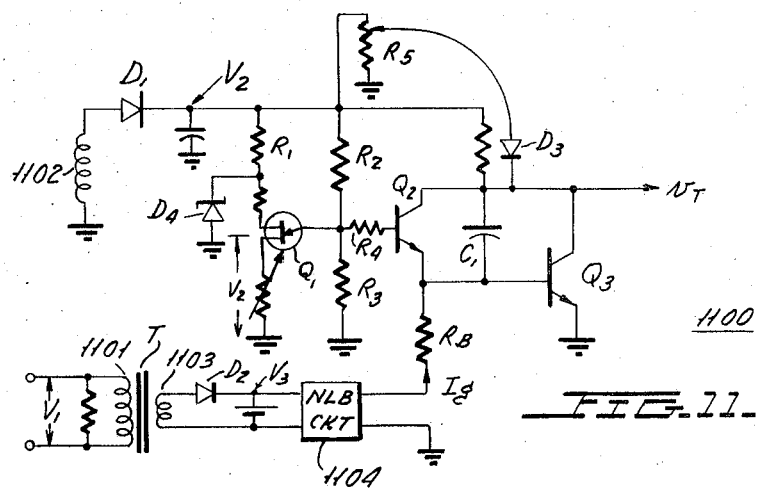
FIGURE 11 is a schematic diagram showing an alternative embodiment for the static time delay circuit of FIGURES 5 and 7.
Figure 9:
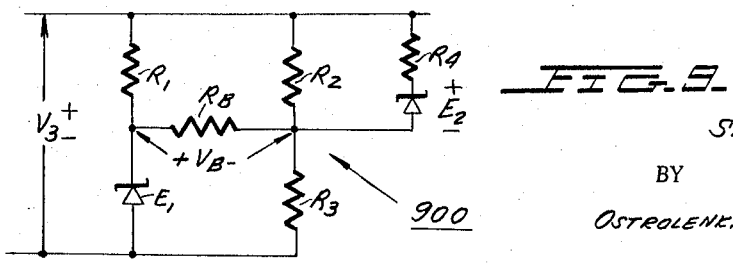
FIGURE 9 is a simplified schematic diagram of the bridge circuit employed for the purpose of generating a current imposed curve having both positive and negative slope.

FIGURE 11 shows an alternative embodiment 1100 for the time delay circuits 500 and 700 of FIGURES 5 and 7 described previously. In this circuit an A.C. signal input $V_1$ is applied to input winding 1101 of two-winding transformer T. One winding 1102 produces a signal which is rectified by diode $D_1$ to produce the voltage $V_2$. The second winding 1103 produces a signal which is rectified by diode $D_2$ to produce the D.C. voltage $V_3$. Voltage $V_3$ is the bridge circuit input voltage and it is proportional to $V_2$. This voltage $V_3$ is impressed upon the input of the non-linear approximating bridge circuit 1104 which produces an output current $I_g$, which in turn is impressed upon the base electrode of transistor $Q_3$ in the same manner as previously described.

The pickup circuit employed in the embodiment of FIGURE 11 is comprised of a unijunction junction transistor $Q_1$ and an NPN transistor $Q_2$. The voltage $V_2$ is impressed upon the cathode electrode of a zener voltage diode $V_4$ to resistor $R_1$. $V_2$ is also impressed upon the emitter electrode of transistor $Q_1$ through a voltage divider circuit comprised of the resistors $R_2$ and $R_3$, the common terminals of which are connected to the emitter of transistor $Q_1$. The operation is such that as the voltage $V_2$ increases in magnitude the voltage upon the emitter electrode of transistor $Q_1$ likewise increases in magnitude so as to reduce the resistance between the emitter electrode of transistor $Q_1$ and ground. This causes transistor $Q_2$ to be cut off thereby enabling the capacitor $C_1$ to be charged before the voltage $V_2$ reaches a "pickup" value. Transistor $Q_2$ due to the voltage divider comprised of resistors $R_2$ and $R_3$, is turned on so as to establish short circuit across capacitor $V_1$ to prevent the capacitor from charging. Thus only the voltage $V_2$ reaches the pickup value, and capacitor $C_1$ is prevented from charging so as to prevent the circuit 1100 from providing an erroneous time delay operation.

Upon the occurrence of a severe short circuit current in the conductor being protected against thermal overload, it is necessary to provide for instantaneous tripping, that is, for tripping with no time delay. This function is performed by the diode $D_3$. A portion of the voltage $V_2$ is impressed upon an anode of diode $D_3$ by the potentiometer R5. Being forwardly biased, diode $D_3$ becomes conductive so that when the voltage $V_2$ reaches a substantially high magnitude the necessary trigger voltage which is developed across potentiometer R5 is immediately present at the collector electrode transistor $Q_3$ in order to provide for instantaneous tripping, that is, tripping with effectively no time delay.

FIGURE 12 shows an alternative embodiment for the static overcurrent relay circuit of FIGURES 5 and 7 wherein the shaping circuit of the static overcurrent relay 1200 is capable of generating an output current in an operating range from 0 to $V_B$ which means that its output current over this operating range may have both positive and negative slope.

A brief review of desired time-current characteristics will be helpful in the description of the following relay circuitry.

The solution of Equation (1) (set forth previously) for a step function of current is:

$$\theta = (I_F^2 R) R_T \left(1 - \epsilon^{-\frac{t}{T}}\right) \qquad (21)$$

Let the maximum temperature which can be tolerated in the protected circuit be $\theta_D$. Therefore, the time to reach temperature $\theta_D$ is:

$$t = T \ln \frac{I_F^2 R R_T}{I_F^2 R R_T \theta_D} \qquad (22)$$

This equation is the maximum allowable time delay for tripping a given faulted circuit.

All time-current characteristics must not exceed the values given by Equation (22).

For $t \ll T$ Equation (22) becomes:

$$\theta = I^2 R R_T \left(\frac{t}{T}\right) \qquad (23)$$

and Equation (22) becomes the familiar:

$$I_F^2 t = K \text{ where } K = \frac{\theta_D C_T}{R} \qquad (24)$$

The following circuitry allows the construction of a relay with time-current characteristics of the form of Equation (22) or (24) and in general will allow the characteristics of the form:

$$t = T \ln \frac{K I_F^M}{K I_F - \theta_D} \qquad (25)$$

$$(V_1 - I_1 R_{17} \beta) = T_1 \frac{dv}{dt} + v \qquad (26)$$

where $\beta =$ current gain of the transistor $Q_1$ (see FIGURE 12).

$R_{17}$ = Collector resistor.
$T_1$ = time constant $(\beta + 1) R (C_1 + C_2 + C_3)$
$v_1$ = output voltage The solution of Equation (26) for a step function input $(V_1 - I_1 R_{17} B)$ is:

$$v = (V_1 - I_1 R_{17} \beta) \left(1 - \epsilon^{-\frac{t}{T_1}}\right) \qquad (27)$$

If $V_T$ is the voltage required to turn on the trigger, the time-voltage characteristics of the time-delay circuit are obtained by setting $v = v_T$ and solving Equation (26) for $t$:

$$t = T_1 \ln \frac{(V_1 - I_1 R_{17} \beta)}{(V_1 - I_1 R_{17} \beta) - v_T} \qquad (28)$$

SHAPING CIRCUIT

Let the desired characteristics of the relay be given by:

$$t = T_0 \ln \frac{K V^n}{K V^n - v_0} \qquad (29)$$

which is Equation (25) since voltage V is proportional to current $I_F$.

To give the time-delay circuit the desired characteristic Equations (28) and (29) must be equal. Equating (28) and (29) and solving for $I_1 R_{17} \beta$ gives:

$$I_1 R_{17}\beta = V_1 - \frac{(KV_1^m)^{\frac{T_0}{T_1}} v_T}{(KV_1^m)^{\frac{T_0}{T_1}} - (KV_1^m - v_0)^{\frac{T_0}{T_1}}} \quad (30)$$

The following two (2) special cases of Equation (30) will give some indication as to the type of curve which results when values of $T_0$, $T_1$, $v_0$, $v_t$ are chosen.

If $T_1 = T_0$ and $v_0 = v_t$ Equation (30) simplifies to:

$$I_1 R_{12}\beta = V_1 - KV_1^M \quad (31)$$

If $n=2$ Equation (31) becomes a parabola:

$$I_1 R_{17}\beta = V_1 - KV_1^2 \quad (32)$$

Equation (32) which is curve 1303 of FIGURE 13, indicates that $I_1$ must have both positive and negative values of slope. If the circuits to be used over a large enough range of $V_1$ and $I_1$ must have both positive and negative values in both slope and magnitude.

In any event, the choice of $n$, $T_1$, $T_0$, $v_0$, and $V_t$ and Equation (30) dictate the form of the output current of the shaping circuit as a function of $V_1$.

Circuits using resistors and zener diodes can be constructed to give a linear approximation of Equation (30) once values are chosen for $n$, $T_0$, $v_0$, $v_t$ and $T_1$. The methods for using an isolated winding to energize a bridge circuit of zener diodes and resistors to give an output of both positive and negative values of magnitude and slope will be described with reference to FIGURE 16.

If the desired time-delay characteristic is given by Equation (29) above and the time-delay circuit equation is (28) then shaping circuit output current $I_1$ to make Equation (28) equal Equation (29) is given by Equation (30):

$$I_1 R_{17}\beta = V_1 - \frac{(KV_1^m)^{\frac{T_0}{T_1}} v_T}{(KV_1^m)^{\frac{T_0}{T_1}} - (KV_1^m - v_0)^{\frac{T_0}{T_1}}}$$

Three (3) types of shaping circuits are possible depending on the range of $V_1$ and the values chosen for $T_0$, $v_0$, $T_1$, $v_t$ and $n$. FIGURE 13 shows the curves produced by each of the three (3) circuits.

The conditions identifying each type of circuit are as follows:

Type 1 is shown in FIGURE 3a. Let $V_M$ be the maximum value of $V_1$ desired. This circuit produces an output current $I_1$ such that:

$$\frac{dI}{dV_1} \geq 0 \text{ for } 0 \leq V_1 \leq V_M$$

and $$I_1 \geq 0 \text{ for } 0 \leq V_1 \leq V_M$$

Type 2 is shown in FIGURES 6a, 7, 9, 12, 16 and 17. These circuits produce an output current $I_1$ such that:

$$\frac{dI}{dV_1} \geq 0 \text{ for } 0 \leq V_1 \leq V_a$$

$$\frac{dI_1}{dV_1} < 0 \text{ for } V_a < V_1 \leq V_M$$

$$I_1 \geq 0 \text{ for } 0 \leq V_1 \leq V_M$$

Type 3 is shown in FIGURES 7, 9, 16 and 17. This circuit produces an output current $I_1$ such that:

$$\frac{dI}{dV_1} \geq 0 \text{ for } 0 \leq V_1 \leq V_b$$

$$\frac{dI_1}{dV_1} < 0 \text{ for } V_b < V_1 \leq V_M$$

and $$I_1 \geq 0 \text{ for } 0 \leq V_1 \leq V_c$$

$$I_1 < 0 \text{ for } V_c < V_1 \leq V_M$$

Returning to FIGURE 12, the embodiment 1200 therein operates substantially similar to the embodiment of FIGURE 7 wherein its shaping circuit 1201 is capable of generating a current $I_1$ which folows the parabolic curve 1303 of FIGURE 13 in the range from 0 to $V_b$. The branches comprising resistor $R_{11}$-zener diode $D_{10}$ and resistor $R_{13}$-zener diode $D_{11}$ provide the portions of parabola 1303 which are positive in slope. That is, the portion from 0 to $V_a$, while the branches comprised of elements $R_{10}$-$D_8$ and $R_{12}$-$D_9$ provide the portions of the parabola 1303 having negative slope, that is, that portion of the curve from $V_a$ to $V_b$. Transistor $Q_2$ is provided for inverting purposes.

The pickup circuit 1203 of circuit 1200 operates such that when the voltage across the voltage divider comprised of resistors $R_4$ and $R_6$ exceeds the zener value of zener diode $D_{12}$. Diode $D_{12}$ conducts to permit the capacitor bank comprised of capacitors $C_1$-$C_3$ to charge. However, before the voltage reaches the pickup value transistor $Q_3$ is non-conductive thereby impressing a positive voltage upon transistor $Q_1$ causing it to turn on and thereby preventing the capacitor bank comprised of elements $C_1$-$C_3$ from charging.

The time delay circuit 1204 is substantially the same as that of FIGURE 1 except that two additional capacitors $C_2$ and $C_3$ are employed, which capacitors may be selectively connected into the time delay circuit in order to provide a time.delay circuit having an adjustable capacitance feature, thereby permitting the circuit 1200 to be utilized in a variety of applications.

The instantaneous trip circuit 1205 is substantially the same as that described in FIGURE 5 wherein the forward biased diode $D_5$ is connected to the gate terminal 1206 of silicon controlled rectifier 1202 through a zener diode $D_{13}$. The trigger circuit 1207 differs from the level detector of FIGURE 5 in that it employs the silicon controlled rectifier 1202 which is connected in a series circuit with the trip device 1208. When the voltage at the input terminal 1209 reaches the trigger voltage level $v_t$ zener diode $D_{13}$ breaks down causing a gate signal of suitable magnitude to be impressed upon the gate 1206 of silicon controlled rectifier 1202. The gate signal causes the SCR 1202 to conduct, thereby completing the series circuit which includes the trip device 1208. Suitable current is provided by the output winding $W_1$ to energize the trip device in order to trip the circuit breaker (not shown) which isolates the monitored conductor (not shown) from the source of energy which feeds this conductor. The filter circuit 1210 provides a suitable D.C. voltage $V_1$ for operating the circuits 1201, 1203, 1204 and 1205.

Figure 14:
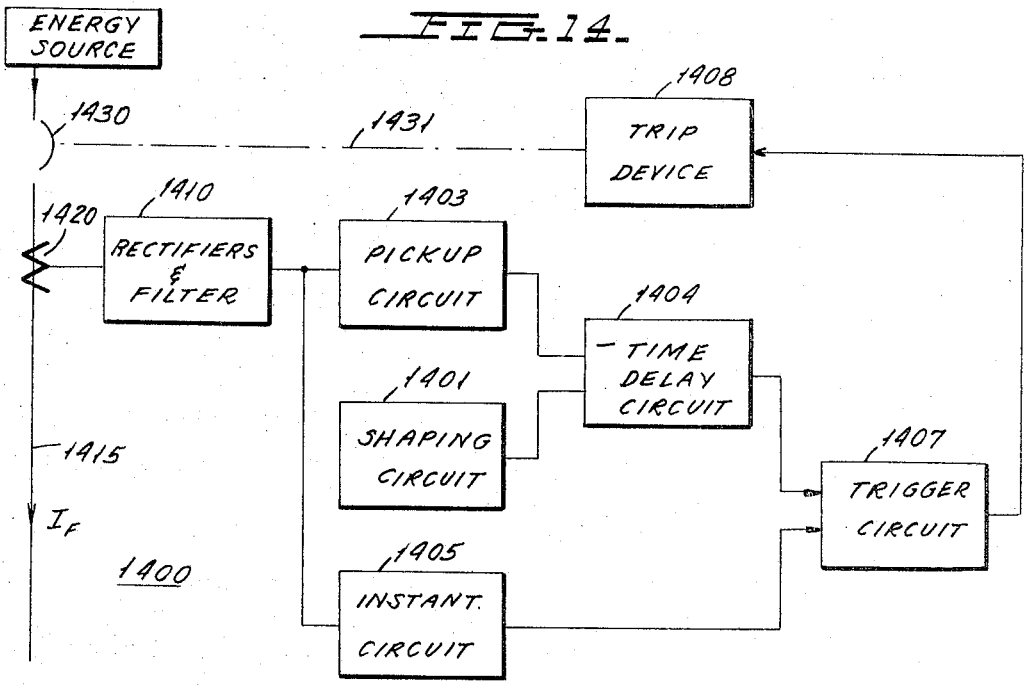
FIGURE 14 shows a block diagram of the time delay circuit and its relationship with the conductor being protected by the static over-current relay means.

FIGURE 14 shows a system block diagram of the static overcurrent relay means associated with the conductor to be protected. The system 1400 is comprised of a conductor 1415 which carries a load current $I_f$. The load current is inductively coupled to the rectifier and filter circuit 1410 which is substantially similar to the circuit 1210 of FIGURE 12 by means of the current transformer 1420. The pickup circuit 1403, shaping circuit 1401, instantaneous circuit 1405, time delay circuit 1404 and trigger circuit 1407 are identical to the respective circuits 1203, 1201, 1205, 1204 and 1207, shown in FIGURE 12. The trip device 1408, which is substantially identical to the trip device of FIGURE 12 is mechanically coupled to a circuit breaker 1430 as represented by phantom line 1431. Thus, upon operation of the trip device 1408 which operates upon occurrence of the trigger voltage circuit breaker 1430 isolates the conductor 1415 from the energy source 1432.

Figure 15:
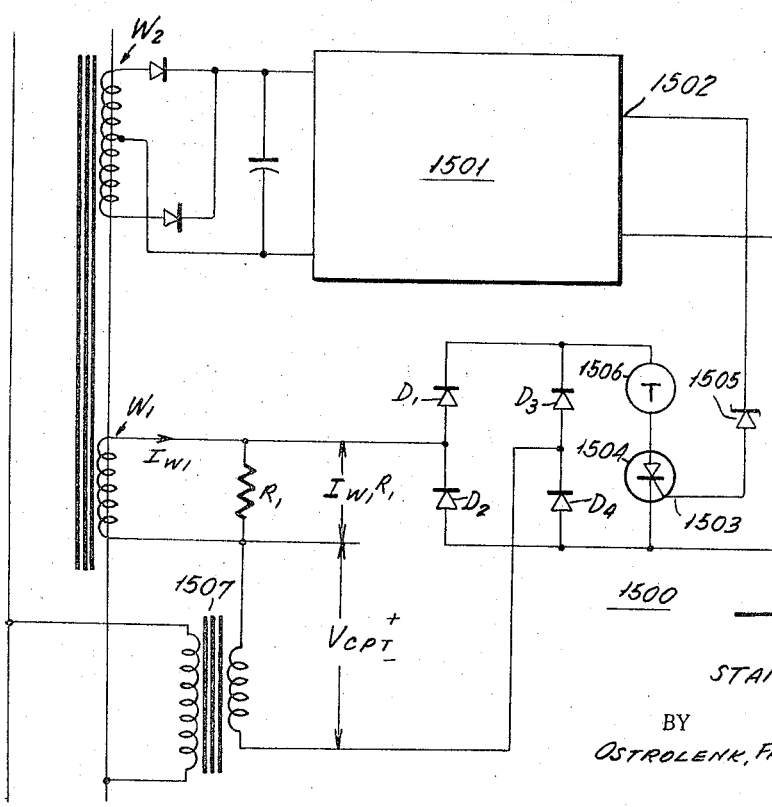
FIGURE 15 is a schematic diagram of a static over-current relay using an alternative tripping arrangement from the tripping arrangement of FIGURE 12.

FIGURE 15 shows a circuit 1500 employing an alternative trip circuit from that of FIGURE 12. The block 1501 contains substantially the same instantaneous circuit, pickup circuit, shaping circuit and time delay circuit as shown in FIGURE 12. The output terminal 1502 of circuit 1501 is connected to the gate terminal 1503 of a SCR 1504 through a zener diode 1505. This arrangement uses a small controlled power transformer 1507 to provide all, or part, of the voltage across the trip coil device 1506. The voltage across resistor $R_1$ caused by current flowing at output winding $W_1$ is in series with the voltage $V_{cpt}$ which is developed by the controlled power transformer 1507. In the absence of primary current the voltage $V_{cpt}$ is available for tripping purposes. The voltage drop $I_{W1}R_1$ is added as the primary current rises. In this manner the tripping voltage remains relatively constant over the entire range of fault currents. As one example, with the scheme of FIGURE 15, a voltage drop across resistor $R_1$ of 50 volts when the current is 20 times pickup current, this allows the use of a relatively small solenoid for the trip device.

In applications where it is necessary to provide a circuit operating range extending from O to $V_c$, as shown in FIGURE 13, it is then necessary to provide a shaping circuit capable of generating both positive and negative magnitude and slope, as shown by the parabolic curve 1303. One method of accomplishing this is by the employment of the shaping circuit 1700, shown in FIGURE 17 of the drawings. This scheme employs two output windings 1701 and 1702. The voltage generated across winding 1702 is rectified and filtered by diode $D_1$ and capacitor $C_b$ respectively, to provide a voltage $V_1'$. The output winding 1701 generates a voltage which is rectified by diodes $D_2$ and $D_3$ and filtered by capacitor $C_a$ to provide a D.C. voltage $V_1$. The voltage $V_1'$ is impressed upon the series branches containing the elements $E_{10}$–$g_{10}$ through $E_{1n}$–$g_{1n}$, which elements are zener diodes and resistors respectively. Voltage $V_1$ is impressed upon terminal 1703 to control the operation of the series branches comprised of elements $E_{20}$–$g_{20}$ through $E_{2n}$–$g_{2n}$. It can be seen that due to the polarity of diodes $D_2$ and $D_3$ that the voltage $V_1$ impressed upon terminal 1703 is negative in polarity in order to generate a parabolic curve such as the curve 1303 in FIGURE 13 over the entire range from 0 to $V_c$.

Figure 16:
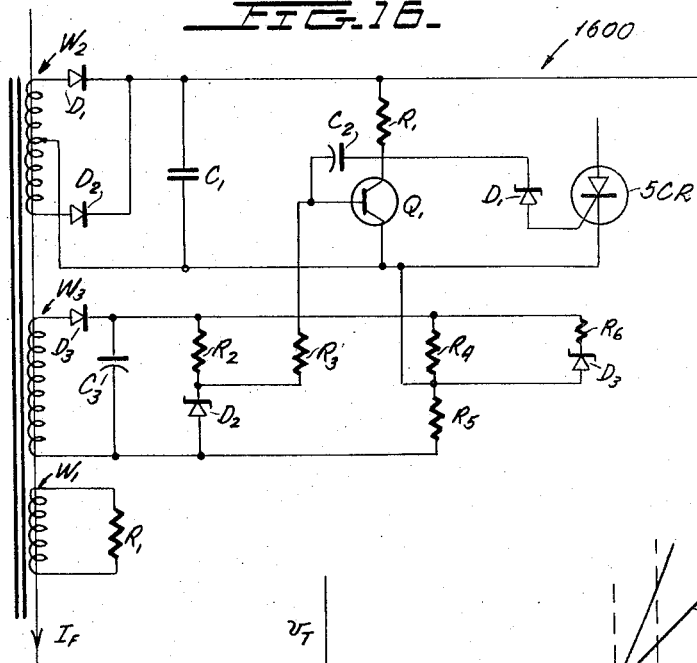
FIGURE 16 is a schematic diagram of a static over-current relay means showing still another alternative embodiment of a tripping arrangement.
Figure 17:
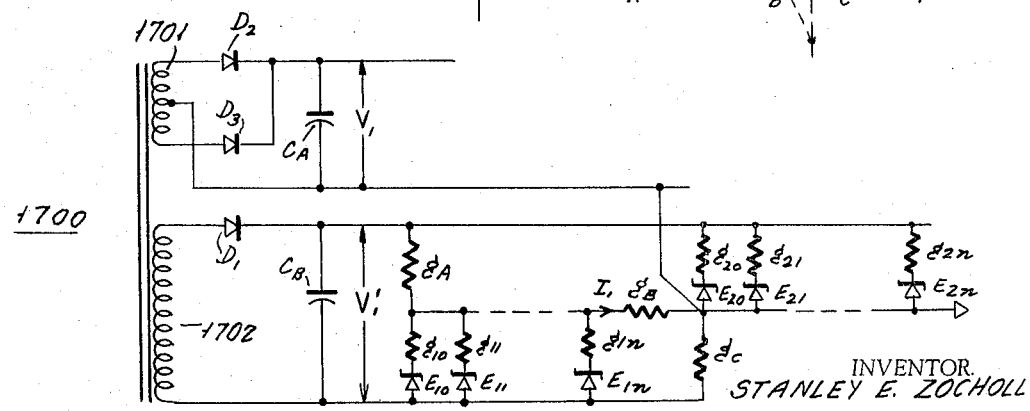

FIGURE 16 shows a schematic diagram of a circuit 1600 which employs the arrangement of FIGURE 17 wherein the winding $W_3$ is isolated from the winding $W_2$ in a manner substantially identical to the windings 1702 and 1701 respectively, of FIGURE 17, wherein winding $W_2$ is shown supplying the necessary voltage for the time delay circuit comprised of the capacitor $C_2$ and transistor $Q_1$. The zener diode $D_2$ is substantially identical to one of the zener diodes in the end branches $E_{10}$ through $E_{1n}$ while the zener diode $D_3$ is substantially identical to one of the zener diodes in the end branches $E_{20}$ through $E_{2n}$. The operation of the time delay circuit and SCR element are substantially identical to the operation of these circuits described with reference to FIGURE 12.

It can, therefore, be seen that the instant invention provides a novel static time delay circuit which provides a time delay relationship in accordance with the temperature equation for a conductor so as to provide time delay tripping to protect the conductor being controlled from damage due to heating thereof and provides the necessary time constants without the use of unusually large capacitances and further includes a novel shaping circuit which produces a linear approximation of a non-linear current curve which may have both positive and negative slope and positive and negative magnitude in the extreme case. The static overcurrent relay means provides very effective operation, while at the same time completely avoiding the necessity of moving parts in order to provide safe, reliable operation, while reducing wear of the circuit considerably.

Although the present invention has been illustrated with exemplary embodiments, it is to be understood that variations and modifications thereof may be made by those skilled in the art, that fall within the broader spirit and scope of the invention, as set forth in the following claims.

What is claimed is:

1. Static overcurrent relay means for use in operating a tripping means to protect a circuit from overheating comprising feedback amplifier means having a capacitive feedback path for electronically simulating the heat equation relating temperature rise due to current flow in a conductor; first means for generating a first voltage signal linearly related to the current flowing in the circuit being protected; the output of said first means being connected to said feedback amplifier means; shaping circuit means connected between said first means and said feedback amplifier means for generating an output signal which is a non-linear function of said first voltage signal to simulate the current term of the heat equation having the form $i^2R=(Cm)d\theta/dt+(KA/l)\theta$ where $i$ = the current flow through the circuit being protected;
$R$ = the resistance of the circuit being protected
$C$ = the thermal capacity of the circuit
$m$ = mass of the circuit
$K$ = thermal conductivity of the circuit
$l$ = length of the circuit
$A$ = area of circuit (cross-section)
$\theta$ = temperature rise above ambient;

said feedback amplifier means being responsive to said first means output signal and said shaping circuit means output signal to generate a trigger voltage signal after a predetermined time delay to operate a tripping means.

2. The relay means of claim 1 further comprising second means connected between the outputs of said first means and said feedback amplifier means for instantaneously generating a tripping voltage signal upon the occurrence of overload currents of severe magnitude.

3. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; said shaping circuit means comprising a plurality of branch circuits each having at least one linear impedance element adapted to generate an output signal which is a piecewise linear approximation of the non-linear output signal desired.

4. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; said shaping circuit means comprising a plurality of branch circuits adapted to generate an output signal which is a piecewise linear approximation of the non-linear output signal desired; each of said branch circuits comprising an impedance element and a constant voltage source connected in series relationship.

5. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; said shaping circuit means comprising a plurality of branch circuits adapted to generate an output signal which is a piecewise linear approximation of the non-linear output signal desired; each of said branch circuits comprising an impedance element and a constant voltage source connected in series relationship, each of said branch circuits being connected in parallel with the output of said first means.

6. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; said shaping circuit means comprising a plurality of branch circuits adapted to generate an output signal which is a piecewise linear approximation of the non-linear output signal desired; each of said branch circuits comprising an impedance element and a constant voltage source connected in series relationship, each of said constant voltage sources being a zener diode each being selected to conduct at differing voltage values.

7. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; said shaping circuit means comprising a plurality of branch circuits adapted to generate an output signal which is a piecewise linear approximation of the non-linear output signal desired; each of said branch circuits comprising an impedance element and a constant voltage source connected in series relationship, a first group of said branch circuits having the negative terminals of their voltage sources connected in common to generate a shaping circuit output signal which has positive slope and magnitude over the operating range of the overload current relay means.

8. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; said shaping circuit means comprising a plurality of branch circuits adapted to generate an output signal which is a piecewise linear approximation of the non-linear output signal desired; each of said branch circuits comprising an impedance element and a constant voltage source connected in series relationship, a first group of said branch circuits having the negative terminals of their voltage sources connected in common to generate a shaping circuit output signal which has positive slope and magnitude over a first portion of the operating range of the overload current relay means; a second group of said branch circuits having the negative terminals of their voltage sources connected in common to generate a shaping circuit output signal which has negative slope over a second portion of the operating range of the current overload relay means.

9. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; said shaping circuit means comprising a plurality of branch circuits adapted to generate an output signal which is a piecewise linear approximation of the non-linear output signal desired; each of said branch circuits comprising an impedance element and a constant voltage source connected in series relationship, a first group of said branch circuits having the negative terminals of their voltage sources connected in common to generate a shaping circuit output signal which has positive slope and magnitude over a first portion of the operating range of the overload current relay means; a second group of said branch circuits having the negative terminals of their voltage sources connected in common to generate a shaping circuit output signal which has negative slope over a second portion of the operating range of the current overload relay means; second means isolated from said first means for generating a second voltage signal which is linearly related to the current flowing in the circuit being protected; said second voltage signal being opposite in polarity to said first voltage signal; the output of said second means being connected to said shaping circuit means causing said shaping circuit means to generate output signal which has negative magnitude over a third portion of the operating range of the overload relay means.

10. Static overcurrent relay means for use in operating a tripping means to protect a circuit from overheating comprising feedback amplifier means; first means having a capactive feedback path for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; level detector means connected to the feedback amplifier means for generating an output signal suitable for operating the tripping means upon receipt of the trigger voltage signal; said level detector being a silicon controlled rectifier; the gate terminal of said silicon controlled rectifier being connected to the output of said feedback amplifier means.

11. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; said feedback amplifier means having a capacitive feedback path to simulate the general heat equation relating temperature rise to current flow through the circuit being protected; the value of said capacitor being selected to provide the necessary time delay.

12. Static overcurrent relay means for use in operating a tripping means to protect a circuit from overheating comprising feedback amplifier means having a capacitive feedback path; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; level detector means connected to the feedback amplifier means for generating an output signal suitable for operating the tripping means upon receipt of the trigger voltage signal; said level detector being a silicon controlled rectifier; the gate terminal of said silicon controlled rectifier being connected to the output of said feedback amplifier means; third means for generating a voltage across the anode and cathode terminals of said silicon controlled rectifier to provide suitable energy for operating the tripping means.

13. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; level detector means connected to the feedback amplifier means for generating an output signal suitable for operating the tripping means upon receipt of the trigger voltage signal; said level detector being a silicon controlled rectifier; the gate terminal of said silicon controlled rectifier being connected to the output of said feedback amplifier means; third means for generating a voltage across the anode and cathode terminals of said silicon controlled rectifier to provide suitable energy for operating the tripping means; fourth means for generating a substantially constant voltage connected in series with the output of said third means to provide ample energy to operate the tripping means when the output voltage of said third means is small relative to the output voltage of said fourth means.

14. Static overcurrent relay means for use in operating a tripping means to protect a circuit from overheating comprising feedback amplifier means having a capacitive feedback path to simulate the general heat equation relating temperature rise to current flow through the circuit being protected; first means for generating a first voltage signal linearly related to the current flowing in the circuit being protected; the output of said first means being connected to said feedback amplifier means; shaping circuit means connected to said first means for generating an output signal which is a non-linear function of said first voltage sigal; the output of said shaping circuit means being connected to said feedback amplifier means; said feedback amplifier means being responsive to said first means output signal and said shaping circuit means output signal to generate a trigger voltage signal after a predetermined time delay to operate a tripping means; pickup circuit means for disabling said feedback amplifier means when thefi rst voltage signal is below a predetermined pickup level; said pickup level being substantially equal to the normal load current condition; said pickup circuit means comprising transistor means; zener diode means connected being the base electrode of said transistor means and the output of said first means; diode means connected between the collector electrode of said transistor means and said feedback amplifier means to disable said feedback amplifier means until the output signal of said first means attains the pickup level.

15. Static overcurrent relay means for use in operating a tripping means to protect a circuit from overheating comprising feedback amplifier means; first means for generating a first voltage signal linearly related to the current flowing in the circuit being protected; the output of said first means being connected to said feedback amplifier means; shaping circuit means connected to said first means for generating an output signal which is a non-linear function of said first voltage signal; the output of said shaping circuit means being connected to said feedback amplifier means; said feedback amplifier means being responsive to said first means output signal and said shaping circuit means output signal to generate a trigger voltage signal after a predetermined time delay to operate a tripping means; pickup circuit means for disabling said feedback amplifier means when the first voltage signal is below a predetermined pickup level; said pickup level being substantially equal to the normal load current condition; said pickup circuit means comprising first and second transistor means, said first transistor means being a unijunction transistor having one base electrode connected to the output of said first means; the emitter electrode of said unijunction transistor being connected to the base electrode of said second transistior means; the emitter and base electrodes of said second transistor means being connected across the feedback path of said feedback amplifier means to disable said feedback amplifier means until the output signal of said first means attains the pickup level.

16. Static overcurrent relay means for use in operating a tripping means to protect a circuit from overheating comprising a capacitive element; level detector means; first means for generating a first voltage signal linearly related to the current flowing in the circuit being protected; the output of said first means being connected to said level detector means; shaping circuit means connected to said first means for generating an output signal which is a non-linear function of said first voltage signal; said capacitive element being connected between the output of said shaping circuit means and said level detector means; said level detector means being responsive to said first means output signal the voltage developed by said capacitive element to generate a trigger voltage signal after a predetermined time delay to operate a tripping means; said shaping circuit means comprising a plurality of branch circuits each having at least one linear impedance; elements adapted to generate an output signal which is a piecewise linear approximation of the non-linear output signal desired.

17. The arrangement of claim 16 further comprising a plurality of zener diodes each being connected in an associated branch circuit; each of said zener diodes having differing turn-on values.

References Cited by the Examiner
UNITED STATES PATENTS

| | | | |
|---|---|---|---|
| 3,132,287 | 5/1964 | Yarbrough | 317—33 |
| 3,157,825 | 11/1964 | Antoszewski et al. | 317—36 |
| 3,160,788 | 12/1964 | Antoszewski et al. | 317—36 |
| 3,229,112 | 1/1966 | Hagland et al. | 317—33 X |

MILTON O. HIRSHFIELD, *Primary Examiner.*

SAMUEL BERNSTEIN, *Examiner.*

MAX L. LEVY, J. D. TRAMMELL,
*Assistant Examiners.*

UNITED STATES PATENT OFFICE
CERTIFICATE OF CORRECTION

Patent No. 3,300,685                      January 24, 1967

Stanley E. Zocholl

It is hereby certified that error appears in the above numbered patent requiring correction and that the said Letters Patent should read as corrected below.

In the drawings, Sheet 3, in Fig. 6a, the resistor connected between resistor Rin and Rc should read as -- RB --; in Fig. 7, the transformer consisting of windings 701, 702, 703 should be labeled T and the voltage across primary winding 701 should be -- $V_1$ --; Sheet 5, in Fig. 12, the rectifier and filter circuit should be labeled -- 1210 --; Sheet 7, in Fig. 14, the "energy source" should be labeled -- 1432 --; Sheet 6, in Fig. 17, the junction of resistors gb and gc should be labeled -- 1703 --; column 5, line 37, after "arrangement." insert the following paragraph:

> FIGURE 17 is a schematic diagram of a static shaping circuit capable of generating both a positive and negative magnitude and slope such as curve 1303 of FIGURE 13.

column 7, line 23, for "322" read -- 323 --; column 9, line 63, for "$v > v_1$" read -- $v \geq v_1$ --; column 10, line 14, for "6" read -- 6a --; column 11, line 49, for "$V_4$" read -- $D_4$ --.

Signed and sealed this 17th day of December 1968.

(SEAL)
Attest:

EDWARD M. FLETCHER, JR.                  EDWARD J. BRENNER
Attesting Officer                         Commissioner of Patents